United States Patent [19]

Riese et al.

[11] Patent Number: 4,848,555
[45] Date of Patent: Jul. 18, 1989

[54] TWIN-DISC CLUTCH

[75] Inventors: Hans-Walter Riese, Schwebheim; Erwin Ziegler, Wasserlosen-Gressthal; Winfried Stürmer, Euerbach; Reinhold Ruppel, Sennfeld, all of Fed. Rep. of Germany

[73] Assignee: Fichtel & Sachs AG, Schweinfurt, Fed. Rep. of Germany

[21] Appl. No.: 166,664

[22] Filed: Mar. 11, 1988

[30] Foreign Application Priority Data

Mar. 12, 1987 [DE] Fed. Rep. of Germany ....... 3707918

[51] Int. Cl.$^4$ ..................... F16D 13/56; F16D 13/75
[52] U.S. Cl. .............................. 192/70.25; 192/111 A
[58] Field of Search ............. 192/70.25, 111 A, 70.28, 192/70.18

[56] References Cited

U.S. PATENT DOCUMENTS

| 4,257,502 | 3/1981 | Riese | 192/70.25 |
| 4,431,097 | 2/1984 | Scheer | 192/70.25 X |
| 4,437,555 | 3/1984 | Tomm et al. | 192/111 A X |

FOREIGN PATENT DOCUMENTS

| 0126188 | 12/1983 | European Pat. Off. |
| 1625711 | 8/1970 | Fed. Rep. of Germany |
| 3041342 | 6/1982 | Fed. Rep. of Germany |
| 1179670 | 1/1970 | United Kingdom |
| 2087001 | 10/1981 | United Kingdom |
| 2087002 | 10/1981 | United Kingdom |
| 2149463 | 11/1984 | United Kingdom |
| 2008209 | 11/1988 | United Kingdom |

Primary Examiner—Rodney H. Bonck
Attorney, Agent, or Firm—Toren, McGeady & Associates

[57] ABSTRACT

The invention relates to a twin-disc clutch with the intermediate plate controlled via a lever mechanism. For easier adjustment of the displacement force of the adjusting device which is provided, this latter is mounted in the center between the axes of rotation of the levers on the intermediate plate. In the case of one embodiment, the levers are guided on the tangential leaf springs; in another embodiment, they are provided at one end with a bearing point while at the other end they are free.

19 Claims, 4 Drawing Sheets

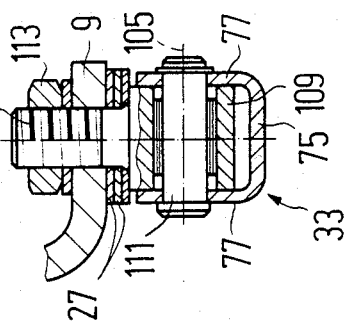
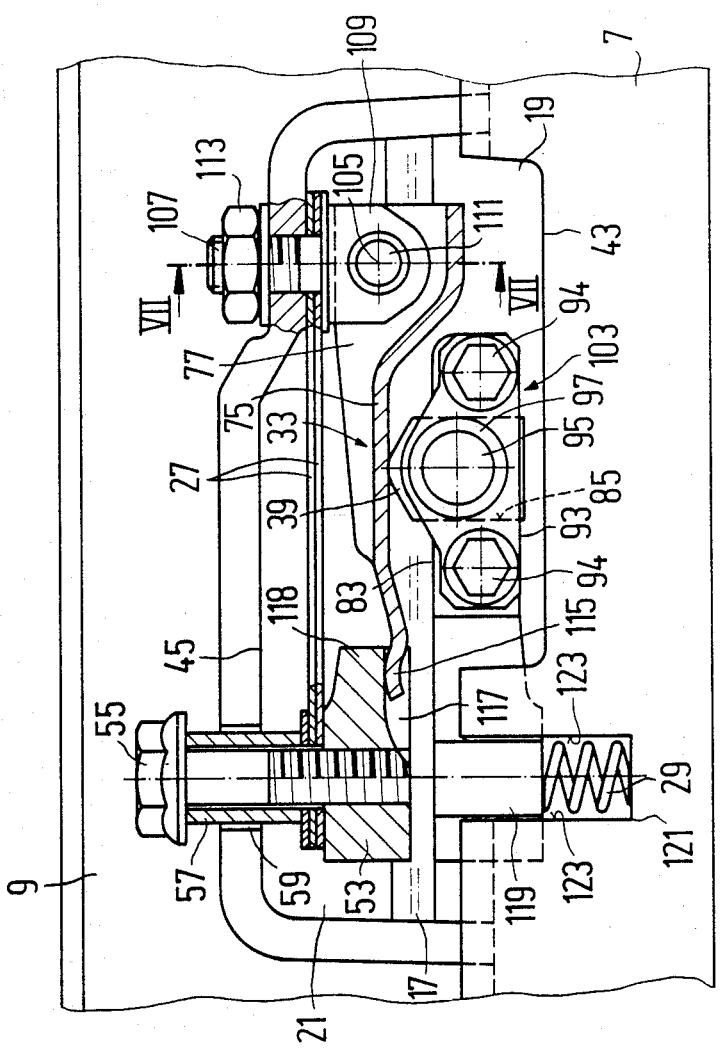

TWIN-DISC CLUTCH

BACKGROUND OF THE INVENTION

The invention relates to a twin-disc clutch, particularly for a motor vehicle.

Already known from DE-A-No. 3 041 342 is a twin-disc clutch having a flywheel rotatable about an axis of rotation and on which there is mounted a clutch housing composed of two axially adjacently disposed housing parts. A pressure plate is axially movably but non-rotatably guided on the housing part which is axially remote from the flywheel. Between the flywheel and the pressure plate, there is an intermediate plate which is non-rotatably but axially movably guided on the other housing part. Between the intermediate plate and the flywheel which forms a counter pressure plate there is a first clutch friction disc while a second clutch friction disc is disposed between the intermediate plate and the pressure plate. The pressure plate is tensioned against the flywheel by a main clutch spring, in this case a diaphragm spring, via the two clutch friction discs and the intermediate plate. When de-clutching, in order to ensure that the intermediate plate is lifted off the first clutch friction disc, an easing-spring means is provided which tensions the intermediate plate away from the flywheel. The easing-spring arrangement comprises pre-tensioned tangential leaf spring which also take over the non-rotatable but axially movable guidance of the intermediate plate.

It is intended that the intermediate plate perform only half the travel of the pressure plate, to ensure that both clutch friction discs are disengaged when de-clutching. Where the known twin-disc clutch is concerned, the pressure plate is connected to the housing via a plurality of articulated levers. The levers have in each case one end connected by a first joint to the pressure plate while their other end is connected to the housing by a second joint. The intermediate plate carries, associated with the levers, projections which bear on the middle of the levers, the pressure plate controlling the movement of the intermediate plate during de-clutching. To facilitate assembly of the twin-disc clutch, the joint mounting the lever on the housing is connected to the housing via an adjusting means. Once a friction force has been overcome, the adjusting means permits of axial displacement of the second articulation. Certainly, it has become manifest that this type of adjusting means must be dimensioned for relatively low displacement forces by virtue of the lever action of the lever. However, such relatively low displacement forces result in tolerance problems in series production.

Known from U.S. Pat. No. 4,257,502 is a further twin-disc clutch in which the lift-off movement of the intermediate plate is controlled by levers which are mounted at both ends on journal bearings of the pressure plate on the one hand and the housing on the other. The levers are fitted radially on the journal bearings and are held on the intermediate plate by a screw which passes through an elongated hole in the middle of the lever. A spring-loaded friction device adjusts the location of the lever relative to the intermediate plate. Where assembly of the prior art twin-disc clutch is concerned, the levers must be installed after assembly of the two housing parts which guide the pressure plate and the intermediate plate. Thus, assembly of the twin-disc clutch is comparatively time-consuming.

The invention is directed towards indicating a twin-disc clutch in which the elements which provide for controlled lift-off of the intermediate plate are non-problematical in respect of any tolerances, and which can be assembled at relatively low cost.

SUMMARY OF THE INVENTION

According to the invention, the lockable sliders, which are supported on the intermediate plate for displacement in the direction of the axis of rotation, ensure on the one hand that the intermediate plate and the first housing part associated with it, and the pressure plate together with the second housing part associated with it, can be pre-assembled independently of each other. For final assembly, it is necessary only to connect the two housing parts to each other. Since the gap adjustment takes place at the sliders and since the level of force here is twice as high as at the joints of the levers, the problems arising from force tolerances in the adjusting device are reduced.

The adjusting device can, for automatic adaptation during assembly, be provided with a friction device of which the friction force is fixed. Alternatively, however, adjustment can also be made manually during assembly, in which case the slider for locking purposes is then screwed onto the intermediate plate. Particularly in the case of the last mentioned alternative, the levers and sliders protect the intermediate plate and their tangential leaf springs in the event of a defect arising in the friction linings of the clutch friction disc which belongs to the pressure plate.

For clutches of which the pressure plate is guided on the housing via tangential leaf springs, the levers which are expediently constructed as parts shaped from sheet metal preferably have a substantially U-shaped cross section, their arms engaging at a minimal distance from but around the tangential leaf springs. Thus, the levers can be guided radially on the tangential leaf springs so that, to form the joints, it is sufficient to allow the end portions of the levers to engage in radially extending slots provided in the fixing zones of the tangential leaf springs on the housing on the one hand and on the pressure plate on the other. In particular, the slots can be formed by sheet metal supporting plates fitted at the attachment points of the tangential leaf springs, the supporting plates having their end portions which point towards each other angled over so that the bottom portions of the levers can engage into the resultant slots. Viewed in a longitudinal direction, the bottom portions of the levers are substantially V-shaped, the apex of the V-shape resting on a then expediently flat surface on the slider.

In another embodiment, the levers are constructed as single-armed levers pivotally mounted on the housing by means of a spindle part extending substantially radially, the free ends of the levers bearing on a supporting point on the pressure plate, from the same side as the flywheel. This development is suitable not only for pressure plates which are guided on the housing via tangential leaf springs, but also for other constructions. In this case, at least in the area between the spindle part and the bearing point of the slider, the levers can be U-shaped, the arms of the U-shape pointing away from the flywheel.

Expediently, the pivot mounting of the previously explained unilaterally pivotally mounted levers, formed by a bearing block, can also be utilized for attaching the ends of tangential leaf springs of the pressure plate. The bearing block can engage between the two arms of the U-shape of the lever and may be provided with a threaded journal which passes through apertures in the tangential leaf spring and the housing, being screwed on from outside the housing. At the free end of the lever, its bottom portion expediently terminates in a curved zone which bears on the bottom of a groove in the pressure plate which is open in the direction of the flywheel. This groove can be provided in an extension of a fixing lug carrying the other end of the tangential leaf spring and extending in the direction of the pressure plate, and may be utilized for centrifugal force bracing of the free end of the lever. The bottom of the lever is, in longitudinal section, expediently of stepped construction and has a portion extending parallel with the flywheel and on which a curved part of the slider bears, and also a portion which projects in the direction of the flywheel and in which the bearing block is disposed. This construction of the levers permits of an axially very compact shape, because the mounting of the levers and thus the bearing block can be shifted into an area which is disposed in the peripheral direction outside of the slider adjusting device.

The sliders have parallel longitudinal sides by which they are guided for axial displacement in associated grooves in the intermediate plate. The grooves are preferably provided on extensions of radial projections on the intermediate plate, which extend in a peripheral direction, and via which the intermediate plate is non-rotatably but axially displaceably guided on the housing. The projections can be used both for fixing tangential leaf springs and also directly for guidance purposes in that they engage in axial slots in the housing.

In the case of a twin-disc clutch having a manual adjustment facility for the sliders, the sliders bear directly on the bottom of the groove and are clamped by a screw and possibly a washer. In the case of embodiments for automatic adjustment of the sliders, the groove is covered radially outwardly by a supporting plate in which there is a radially extending bolt which is tensioned by springs outside the retaining plate while on the inside clamping the slider with a preset friction force between two friction rings and a disc. The friction force is so dimensioned that the slider—brought into its position closest to the pressure plate—can be automatically adjusted when the clutch is assembled without damaging other component parts. The force which has to be applied to displace the slider is in any event greater than the pre-tensioning force exerted on the intermediate plate by the easing-spring.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 6 is a partial view of another embodiment of twin-disc clutch, viewed radially from the outside; and FIG. 7 is a sectional view through a detail of a lift-off control arrangement for the twin-disc clutch shown in FIG. 6, taken on a line VII—VII.

DETAIL DESCRIPTION OF THE DRAWINGS

Figure 1:
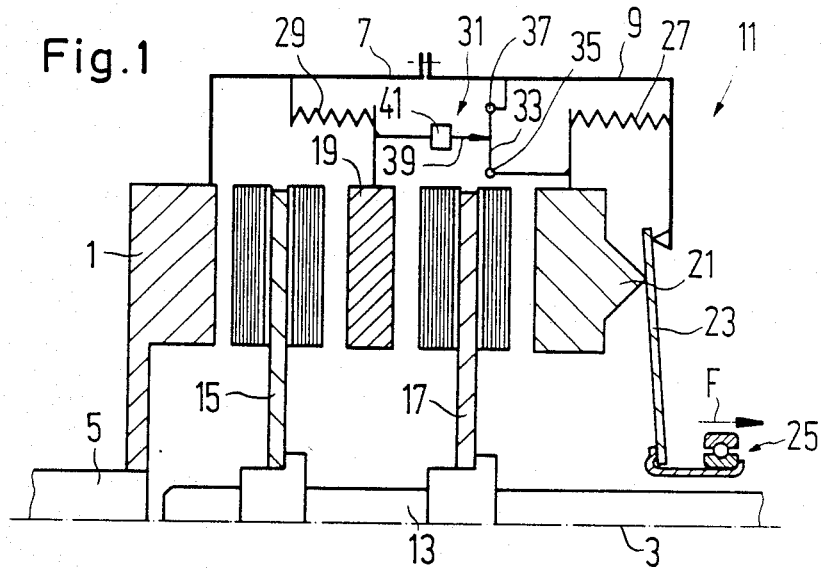
FIG. 1 shows the principle of the upper half of a twin-disc clutch of a motor vehicle in which the lifting off of the intermediate plate is controlled.

FIG. 1 is a view showing the principle of a motor vehicle twin-disc clutch. Fixed on a flywheel 1 which is mounted on a crank shaft 5 rotating about an axis of rotation 3 is a housing 11 composed of two axially adjacently disposed housing parts 7, 9. Extending into the housing 11 is a gear shaft 13 on which two clutch friction discs 15, 17 are non-rotatably but axially displaceably guided. The clutch disc 15 is disposed between an intermediate plate 19 and the flywheel 1 while the clutch disc 17 is provided between the intermediate plate 19 and a pressure plate 21. The intermediate plate 19 is in this respect non-rotatably but axially displaceably guided on the housing part 7 which is adjacent the flywheel while the pressure plate 21 is non-rotatably but axially displaceably guided on the housing part 9 which is remote from the flywheel 1. A main clutch spring, in this case a diaphragm spring 23, biassed on the housing part 9 pre-tensions the pressure plate 21 via the clutch disc 17, the intermediate plate 19 and the clutch disc 15 against the flywheel 1. In this case, the flywheel 1 constitutes a counter pressure plate. For de-clutching, in other words disengagement of the clutch, there is provided a disenganging system 25 which engages the diaphragm spring 23 and which, upon movement in the direction of an arrow F, relieves the pressure plate 21 and therefore the clutch discs 15, 17 and also the intermediate plate 19.

To ensure that the pressure plate 21 lifts off the clutch disc 17, there is provided, engaging between the pressure plate 21 and the housing part 9, an easing spring 27 which pulls the pressure plate 21 off the flywheel 1 when relieved of the force of the diaphragm spring 23. A further easing spring 29 is provided between the intermediate plate 19 and the housing part 7. The easing spring 29 pulls the intermediate plate 19 likewise away from the flywheel 1 and towards the pressure plate when relieved of the force of the diaphragm spring 23.

A lift-off control arrangement generally designated 31 ensures that the lift-off travel of the intermediate plate 19 is half the lift-off travel of the pressure plate 21. The lift-off control arrangement 31 comprises a plurality of levers 33 which have one end connected to the pressure plate 21 via a joint 35 while the other end is connected to the housing part 9 through a joint 37. The levers 33, of which only one is shown in FIG. 1, are offset in respect of one another in the peripheral direction of the pressure plate 21. Associated with each of the levers 33 is a slider 39 which is guided on the intermediate plate 19 for displacement in the direction of the axis of rotation 3, being adapted to be locked by a locking arrangement 41. Under the force of the easing spring 29, the slider 39 bears on the lever 33 between the joints 35, 37 and in the middle of the lever 33, so ensuring that the easing travel of the intermediate plate 19 amounts to half the easing travel of the pressure plate 21. Since the slider 39 rests loosely on the lever 33, the housing part 7 and the intermediate plate 19, including the slider 39 on the one hand and the housing part 9 and the pressure plate 21 including the lever 33 on the other hand can be pre-assembled, so simplifying final assembly of the clutch. Furthermore and particularly in the case of automatic adjusting devices which will be explained in greater detail hereinafter, it is necessary to maintain only comparatively minimal tolerances in terms of the necessary friction forces.

Details of twin-disc clutches of the kind shown is principle in FIG. 1 will be described hereinafter. Parts which have an equivalent effect are designated by the reference numerals used with reference to FIG. 1, reference being made to the description of FIG. 1 by way of illustration.

Figure 3:
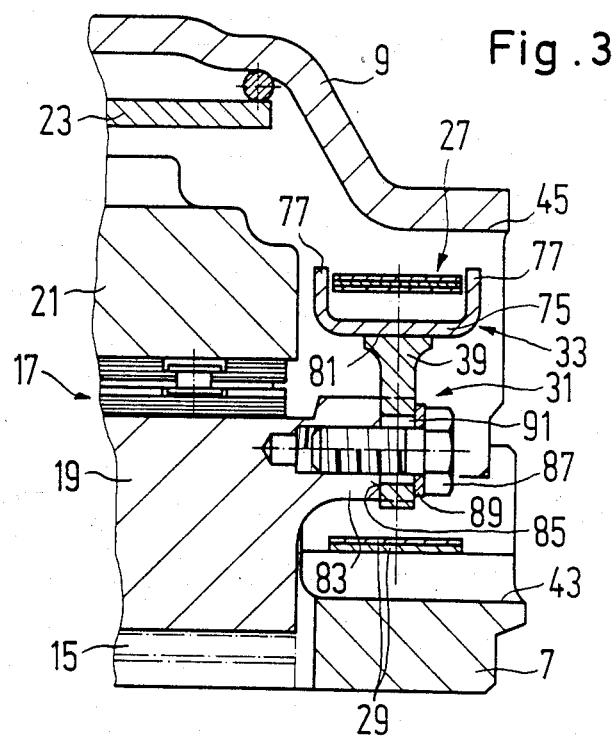
FIG. 3 is a partly sectional view through the twin-disc clutch taken on a line III—III in FIG. 2.
Figure 2:
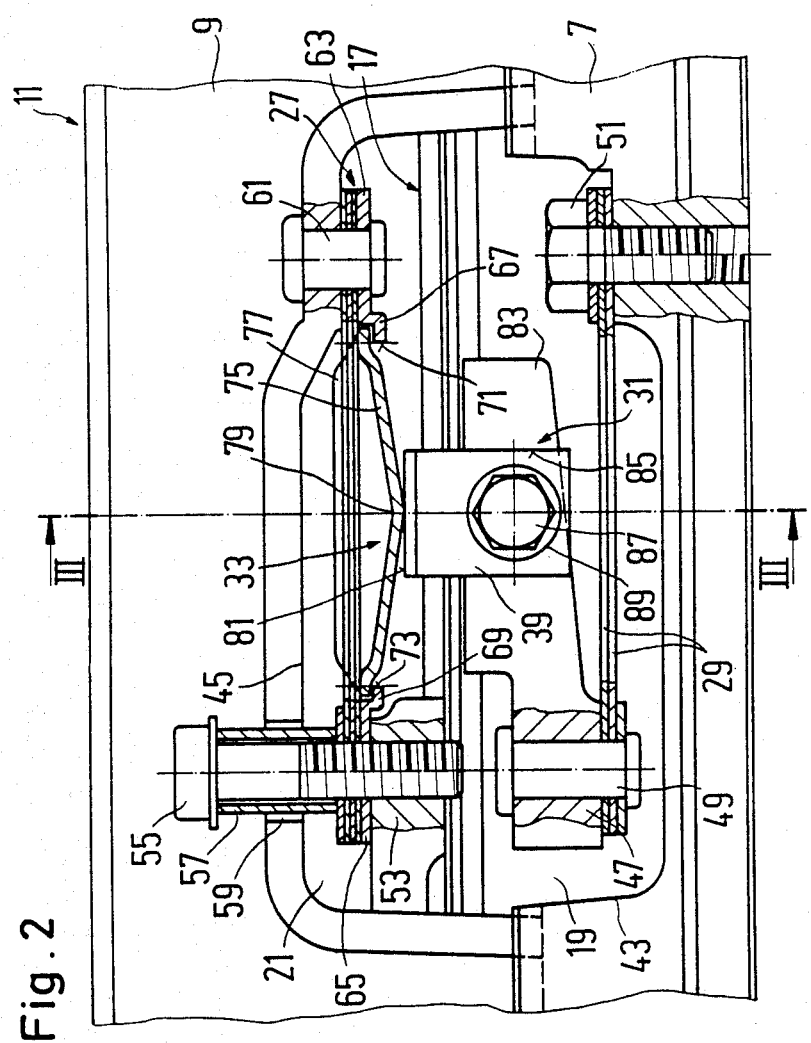
FIG. 2 is a partial view of a twin-disc clutch, viewed radially from the outside and looking at the area in which the lift-off control is disposed.

FIGS. 2 and 3 shows a partial view, radially from the outside, showing a twin-disc clutch and a section III—III through the lift-off control arrangement. In FIG. 2, the clutch disc 15 and the flywheel 1 have been omitted. The clutch housing 11 consists of the two housing parts 7 and 9, the housing part 7 being mounted directly on the flywheel 1 while the housing part 9 is fixed on the part 7. Both housing parts 7, 9 are, in the region of the lift-off control means 31, recessed radially outwardly. The housing part 7 in the example of embodiment illustrated is constructed as a casting and is provided with a recess 43 while the housing part 9 is constructed as a sheet metal part and is provided with a recess 45 created by radially raising the sheet metal material. At this juncture, it should be mentioned that there are on the twin-disc clutch and distributed around the periphery, a plurality of lift control means 31 of the type shown in FIGS. 2 and 3, usually at least three such arrangements being provided. Projecting into the recess 43 in the housing part 7 is a fixing lug 47 of the intermediate plate 19 on which a rivet 49 secures the easing spring 29 which is constructed as a tangential leaf spring. The other end of the tangential leaf spring 29 is anchored to the housing part 7 by a screw 51. The tangential leaf springs 29, pre-tensioned in an axial direction, form at the same time the non-rotatable connection of the intermediate plate 19 on the housing 11. However, it is also readily possible to provide a different non-rotatable connection (such as is shown for example in FIG. 6), in which case then separate easing springs have to be provided. Likewise projecting into the recess 45 of the housing part 9 is a fixing lug 53 of the pressure plate 21 on which a screw 55 likewise secures the easing spring 29 which is constructed as a tangential leaf spring and which serves for non-rotatable guidance of the pressure plate 21. In the present case, the screw 55 in a bush 57, traverses an aperture 59 in the housing part 9 and serves as an overextension safeguard for the tangential leaf springs 27 in the as yet unassembled condition of the clutch. In this pre-assembly stage, due to the force of the diaphragm spring 23, the head of the screws 55 comes to bear on the housing 11. The tangential leaf springs 27 are at the other end rivetted on the housing part 9 by rivets 61. At both attachment points of the tangential leaf springs 27 there are on the side which is towards the intermediate plate 19 or the flywheel 1 retaining plates 63, 65 which have crank ends 67, 69 which point towards each other and which in a radial direction form slots 71, 73 which are provided for the pivotable mounting of the levers 33. The levers 33 extend parallel with the tangential leaf springs 27 between the attachment points at 55, 61, are deep-drawn from sheet metal and are of a U-shaped cross section. The U-shape can be seen particularly clearly in FIG. 3. The levers 33 have thereby a bottom 75 which extends in a radial direction substantially parallel with the tangential leaf spring 27, and, pointing away from the bottom 75, two arms 77 which are directed towards the tangential leaf springs 27 around which they engage with a very small radial gap. In this way, the levers 33 are guided in a radial direction through the tangential leaf springs 27. The bottom 75 extends in the longitudinal direction of the levers 33 into the slots 71, 73 forming therewith the joints 35, 37 shown in FIG. 1 of which the axis of rotation extend substantially radially. In the longitudinal direction, the bottom 75 is of substantially V-shaped construction, preferably with a V angle of about 160°, and its tip 79 bears on a plane portion 81 of the slider 39. The slider 39 is disposed on an extension 83 of the lug 47 which extends in a peripheral direction into the region of the tangential leaf springs 27. The extension 83 is provided with a groove 85 which extends in the axial direction of the twin-disc clutch, in fact parallel with the axis of rotation 3 (FIG. 1). Inserted into the parallel side walls of the groove 85, substantially without clearance, are the long sides of the slider 39, the latter being supported by a screw 87, through a washer 89, held by frictional clamping. The screw 87 traverses an elongated hole 91 in the slider 39.

The assembly of the twin-disc clutch according to FIGS. 2 and 3 and the way it functions are as follows:

The housing part 9 is pre-assembled together with the diaphragm spring 23 and the pressure plate 21. The tangential leaf springs 27 are hereby rivetted to the housing part 9 and the pressure plate 21 is connected by the screws 55 likewise to the tangential leaf springs 27. When this assembly process takes place, the levers 33 are already inserted. Furthermore, the housing part 7 is connected by the tangential leaf springs 29 to the intermediate plate 19 and the sliders 39 are provisionally just loosely fixed by the screws 87. Both housing parts 7 and 9 are bolted to the flywheel 1, the clutch discs 15, 17 being inserted in between. During this assembly process, all the parts are in the engaged state, in other words with no air space between the clutch discs 15, 17 on the one hand and the intermediate plate 19 and flywheel 1 and the pressure plate 21 on the other. This position is shown in FIG. 2 and in FIG. 3. Subsequently to this assembly process, the sliders 39 are adjusted in fact they are brought to bear on the tips 79 of the levers 33, whereupon the screws 87 are tightened to a predetermined torque. Thus, the sliders 39 are so fixed on the intermediate plate 19 via a friction force that in normal operation they are unable to displace the twin-disc clutch. Preferably, the friction force chosen is sufficiently high that if the friction linings of the clutch disc 17 become more seriously worn than those of the clutch disc 15, compensation of the conditions of wear between the friction linings of the two clutch discs 15 and 17 can be achieved via the levers 33 which bear on the sliders 39. Certainly the displacement force can be so limited by a corresponding tightening of the screws 87 that with unexpectedly heavy wear and tear on the friction linings of the clutch disc 17 or in the event of this clutch disc becoming totally defective, the sliders 39 can be displaced in the groove 85 in the direction of the flywheel 1 by the force of the diaphragm spring 23 so that the levers 33 and the tangential leaf springs 27 can be safeguarded against damage. The arrangement can thus be designed as a safeguard against overload.

Figure 4:
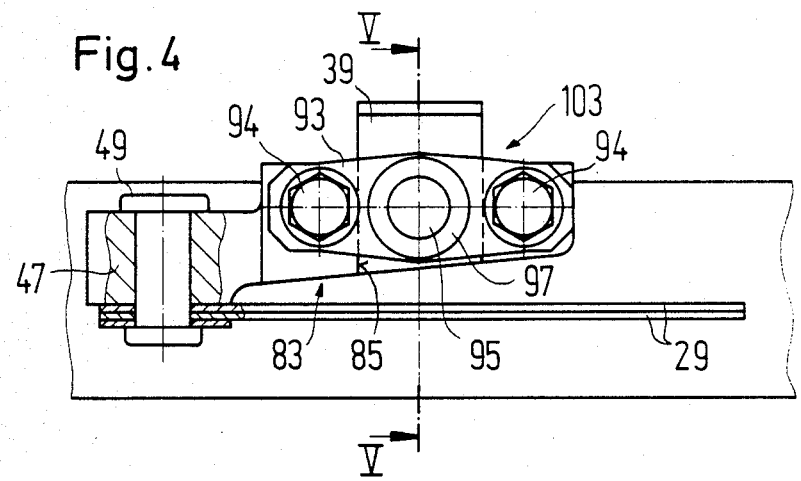
FIG. 4 is a partial view of an alternative lift-off control arrangement for a twin-disc clutch similar to FIG. 2.
Figure 5:
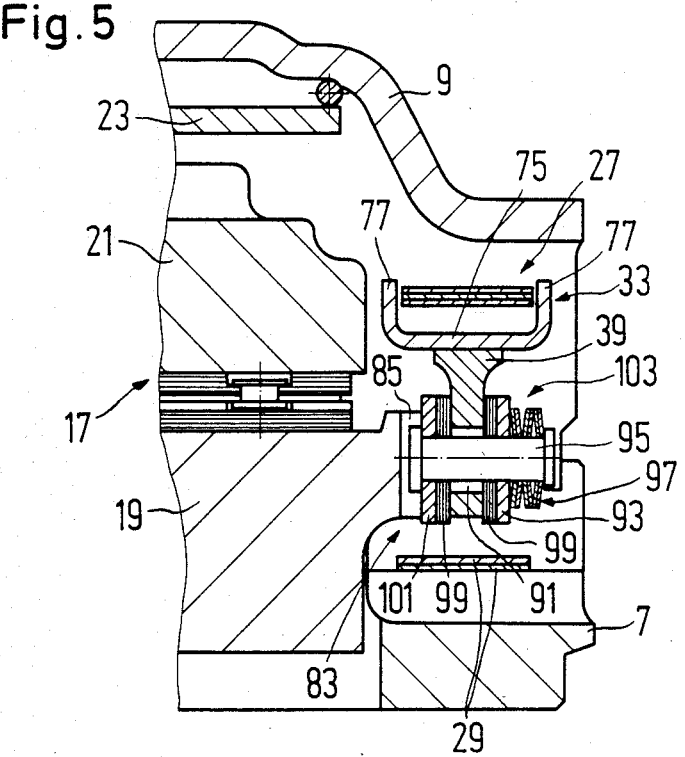
FIG. 5 is a sectional view through the lift-off control taken on the line V—V in FIG. 4.

FIGS. 4 and 5 show another type of slider attachment for a twin-disc clutch according to FIGS. 1 and 2. In this case, FIG. 4 is a partial view similar to that in FIG. 2 while FIG. 5 shows a section V-V according to FIG. 4. The other components according to FIGS. 1 and 2 are unaltered.

In the present case, the sliders 39 are mounted on a supporting plate 93 which outwardly masks the radially outwardly open groove 85 in the extension 83 of the intermediate plate 19 being screwed into position with screws 94. In the supporting plate 93 there is in each case a bolt 95 provided at its ends with heads and which extends substantially radially, being subject outside the supporting plate 93 to the action of a package of plate springs 97, in its longitudinal direction. It extends radially inwardly into the groove 85 and there penetrates two friction rings 99 and a disc 101 without clearance and also, with clearance, the elongated hole 91 in the slider 39 which is disposed between the two friction rings 99. As a result of this construction of the adjusting device 103, the slider 39 is supported by a friction force which can be established within relatively narrow limits. The friction force is usually so adjusted that it is in any case higher than the easing force of the tangential leaf springs 29 while not being lower than the limit loading of the levers 33. This type of friction arrangement makes it possible to assemble the twin-disc clutch without any manual adjustment of the sliders 39. For this purpose, prior to assembly of the twin-disc clutch, each of the sliders 39 is brought into its extreme position which is farthest away from the flywheel 1. This position is achieved when, according to FIG. 5, the end of the elongated hole 91 which i towards the flywheel bears directly on the bolt 95. During subsequent assembly of the two housing parts 7 and 9 on the flywheel 1, all the sliders 39 come to bear on the bottom 75 of the levers 33 and move in the elongated hole 91 automatically into the correct clearance-free position in relation to the levers 33. Here, too, it is ideal to adjust the friction force for displacement of the sliders 18 in such a way that if the friction linings of the clutch disc 17 become more severely worn compared with the clutch disc 15, it is possible via the lift-off control arrangement to apply greater pressure to the friction linings of the clutch disc 15 so that their wear behavior is adapted. In the event of an unforeseen destruction at the clutch disc 15, the adjusting device 103 can serve as a safeguard against overloading of the levers 33 and the tangential leaf springs 27.

FIGS. 6 and 7 show a partial view of a twin-disc clutch radially from the outside and also a section VII—VII through the point of articulation of one of the levers 33. With this embodiment of twin-disc clutch, levers 33 are provided which are at one end, via a pivot joint, mounted about a substantially radially extending pivot axis 105 while their other end rests on a bearing location. The principal advantage of such a development resides in that the levers 33 can be provided regardless of the nature of the non-rotatable connection of the pressure plate 21. It is therefore readily possible, instead of the tangential leaf springs 27 which are illustrated, to provide an easing spring and guide elements such as are chosen in the housing part 7 for the intermediate plate 19.

In the present case, the pressure plate 21 is in a manner already described fixed on the housing part 9 via tangential leaf springs 27. Attachment of the tangential leaf springs 27 on the housing part 9 is effected by threaded studs 107 which are part of a bearing block 109. The bearing block 109 has a respective substantially radially extending bore in which there is a bolt 111 which fixes the axis of rotation 105. The bolt 111 engages apertures in both arms 27 of the U-shaped lever 33. The two arms 77 engage substantially without clearance around the bearing block 109. From the bearing block 109, they run in the direction of the fixing lug 53 towards the other end of the tangential leaf springs 27 to a point above the bearing location on the slider 39. The bottom 75 of the lever 33 is thereby of cranked construction in its longitudinal section shown in FIG. 6, in fact in such a way that it extends around the bearing block 109 on the one hand while on the other, it is staggered in the region of the adjusting means 103 in the direction of the housing part 9. In the area in which there is contact with the slider 39, the bottom 75 extends substantially parallel with the clutch discs 15, 17 and the slider 39 has a bearing curvature. Upon assembly of the tangential leaf springs 27 on the housing part 9, the bearing block 109 together with the pre-mounted lever 33 has its threaded stud 107 extending through the tangential leaf springs and the housing, being tightened on the front face by a nut 113. The free end of the lever 38 has a curvature 115 on the bottom resting in the bottom of a groove 117 made in an extension 118 of the fixing lug 53. The groove 117 is open in the direction of the flywheel 1 so that its side wall with the greater distance from the axis of rotation 3 can at the same time serve as a centrifugal force support for the free end of the lever 33. In the present construction, the intermediate plate 19 has radially projecting members 119 which extend into corresponding slots 121 in the housing part 7, establishing together with these latter a non-rotatable but axially displaceable connection. The side walls 123 of the slots 121 extend in an axial direction of the clutch and are sufficiently deep in the direction of the flywheel 1 that it is possible to dispose here a separate easing spring 29. The adjusting device 103 is disposed on the extension 83 of that part of the intermediate plate 19 forming the projection 119 which extends in a peripheral direction. In the present case, it comprises all the features of the adjusting device according to FIGS. 4 and 5 so that a more detailed description is unnecessary in this case also. The only difference with regard to the embodiment shown in FIGS. 4 and 5 is that in this case the slider 39 is provided with a curved portion and rests on a flat part of the bottom 75 of the lever 33. The non-rotatable connection shown here between the intermediate plate 19 and the housing part 7 can readily be applied also to the non-rotatable connection of the pressure plate 21 in respect of the housing part 9. This is possible because the levers 33 used here are independent of the disposition of the tangential leaf springs 27. The setting of the adjusting device 103 is likewise automatic when this clutch is assembled in that the slider 39 is moved into its position which is farthest from the flywheel 1 and after the clutch has been assembled the slider 39 automatically adjusts to its clearance-free position in relation to the lever 33.

A construction according to DE-OS No. 1 625 711 is also conceivable, where the pressure plate is guided in a peripheral direction via disengaging levers and is subject to the action of coil springs. In such a case, the intermediate plate can be pre-assembled via tangential leaf springs, according to FIG. 2, and the sliders can rest on the levers which are articulatingly mounted on the pressure plate at one end and on the housing at the other.

While specific embodiments of the invention have been shown and described in detail to illustrate the application of the inventive principles, it will be understood that the invention may be embodied otherwise without departing from such principles.

What we claim is:

1. A twin-disc clutch, comprising
a flywheel rotatable about an axis of rotation,
a clutch housing composed of a first housing part adjacent the flywheel and a second housing part disposed axially alongside the first housing part,
a pressure plate non-rotatably but axially movably guided on the second housing part,
an intermediate plate disposed between the flywheel and the pressure plate and non-rotatably but axially movably guided on the first housing part,
a first clutch friction disc disposed between the flywheel and the intermediate plate,
a second clutch friction disc disposed between the intermediate plate and the pressure plate,
main clutch spring means resiliently stressing the pressure plate towards the flywheel,
easing spring means pre-tensioning the intermediate plate away from the flywheel,
a plurality of levers extending substantially tangentially in relation to the pressure plate and having one end braced by a first joint on the pressure plate while at the other end they are braced by a second joint on the housing, projections provided on the intermediate plate and via which, under the tension of the easing spring means, the intermediate plate is braced between the first and the second joints on the individual levers, wherein the projections are constructed as lockably supported sliders displaceable on the intermediate plate in the direction of the axis of rotation.

2. A twin-disc clutch according to claim 1, wherein the sliders are bolted on the intermediate plate.

3. A twin-disc clutch according to claim 1, wherein fixed on the intermediate plate and associated with the individual sliders there are friction devices of which each comprises at least one friction element bearing on the slider and one spring which presses the friction element against the slider.

4. A twin-disc clutch according to claim 1, wherein the intermediate plate comprises axially extending grooves in which the sliders are guided for axial displacement.

5. A twin-disc clutch according to claim 4, wherein the slider contains an elongated hole and rests on the bottom of the groove and wherein the slider is screwed onto the intermediate plate by a screw which passes through the elongated hole.

6. A twin-disc clutch according to claim 4, wherein fixed on the intermediate plate and masking the groove is a supporting plate which contains a hole over the groove, wherein the slider contains an elongated hole being disposed between the supporting plate and a disc which likewise contains a hole, wherein a bolt provided with a head at each end movably traverses the elongated hole in the slider and the holes in the supporting plate and the disc, wherein between the slider on the one hand and both the supporting plate and also the disc on the other there are friction rings, and wherein a spring biassed on one of the heads of the bolt clamps the slider between the friction rings.

7. A twin-disc clutch according to claim 6, wherein the spring is constructed as a plate spring arrangement and is disposed on the radially outer side of the supporting plate.

8. A twin-disc clutch according to claim 4, wherein the intermediate plate comprises a plurality of peripherally staggered radial projections on which engage guide elements for non-rotatable but axially movable guidance of the intermediate plate, and wherein the projections have extending in a peripheral direction of the intermediate plate extensions in which the grooves are provided.

9. A twin-disc clutch according to claim 1, wherein the pressure plate is non-rotatably but axially movably guided on the housing via a plurality of peripherally staggered tangential leaf springs, and wherein each lever has a substantially U-shaped cross section formed by an elongated bottom portion and arm portions extending longitudinally of the bottom portion, the bottom portion extending on that side of the tangential leaf spring which is towards the flywheel longitudinally of the tangential leaf spring, the side portions enclosing the tangential leaf spring between them.

10. A twin-disc clutch according to claim 9, wherein the bottom portion of the lever, to form the joints, has its ends engaging into substantially radially extending slots in the pressure plate on the one hand and in the housing on the other.

11. A twin-disc clutch according to claim 10, wherein fixing members provided for attaching the ends of the tangential leaf spring additionally maintain supporting plates on the pressure plate or housing, and wherein the supporting plates have cranked portions for forming the slots.

12. A twin-disc clutch according to claim 9, wherein the bottom portion of the lever, viewed in longitudinal section, is V-shaped, having an obtuse V-angle, and wherein the slider has a flat surface resting on the tip of the V-shape of the bottom portion.

13. A twin-disc clutch according to claim 1, wherein the levers are constructed as one-armed levers which are pivotally supported on the housing by a spindle part which extends substantially radially and which forms the second joint, and wherein to form the first joint, there is a free end which rests on that side of the pressure plate which is towards the flywheel.

14. A twin-disc clutch according to claim 13, wherein at least in the region between the second joint and the supporting point of the slider, the lever is U-shaped and has at least in this portion two arm portions which project from an elongated bottom portion.

15. A twin-disc clutch according to claim 14, wherein the pressure plate is non-rotatably but axially movably guided on the housing via a plurality of peripherally staggered tangential leaf springs, and wherein the second joint of each lever comprises a bearing block fixed to the housing by means of a stud, the stud traversing a hole in the tangential leaf spring and at the same time attaching the tangential leaf spring to the housing.

16. A twin-disc clutch according to claim 15, wherein the stud is constructed as a screw threaded stud and supports the tangential leaf spring between the bearing block and the housing.

17. A twin-disc clutch according to claim 15, wherein the arm portions engage laterally around the bearing block and are mounted on the bearing block by means of a bolt seated in a substantially radial bore in the bearing block and engaging into apertures in the arm portions.

18. A twin-disc clutch according to claim 15, wherein the bottom portion of the lever is of stepped construction in longitudinal section, its middle portion extending substantially parallel with the flywheel while in the region of the bearing block it projects forwardly towards the flywheel, and wherein the slider has a curved face which rests on the middle portion of the bottom part.

19. A twin-disc clutch according to claim 13, wherein the pressure plate has associated with the levers and open towards the flywheel, grooves into which engage the free ends of the levers, the side walls of the grooves which are remote from the axis of rotation forming centrifugal force supporting faces for the free ends of the levers.

* * * * *